(12) United States Patent
Jackson et al.

(10) Patent No.: US 9,983,002 B2
(45) Date of Patent: May 29, 2018

(54) ENHANCING GEOLOCATION USING BAROMETRIC DATA TO DETERMINE FLOORS AT A LOCATION

(71) Applicant: Google LLC, Mountain View, CA (US)

(72) Inventors: Dean Kenneth Jackson, Pittsburgh, PA (US); Daniel Victor Klein, Pittsburgh, PA (US); John Richard Kochmar, Allison Park, PA (US)

(73) Assignee: Google LLC, Mountain View, CA (US)

( * ) Notice: Subject to any disclaimer, the term of this patent is extended or adjusted under 35 U.S.C. 154(b) by 572 days.

(21) Appl. No.: 13/929,053

(22) Filed: Jun. 27, 2013

(65) Prior Publication Data

US 2015/0006100 A1 Jan. 1, 2015

(51) Int. Cl.
*G01R 35/00* (2006.01)
*G01C 5/06* (2006.01)

(52) U.S. Cl.
CPC ...................... *G01C 5/06* (2013.01)

(58) Field of Classification Search
CPC ........................................................ G01C 5/06
USPC ..................................................... 702/94, 138
See application file for complete search history.

(56) References Cited

U.S. PATENT DOCUMENTS

| | | | | |
|---|---|---|---|---|
| 2012/0209554 A1* | 8/2012 | Hoole | ...................... | G01C 5/06 702/94 |
| 2012/0265373 A1* | 10/2012 | Ingvalson | .............. | G01C 21/20 701/4 |
| 2012/0315918 A1 | 12/2012 | Kadous | | |
| 2013/0041610 A1 | 2/2013 | Waters et al. | | |
| 2014/0012529 A1* | 1/2014 | Lee | ........................... | G01C 5/06 702/94 |
| 2014/0114567 A1* | 4/2014 | Buchanan | ............ | G01C 21/005 701/454 |
| 2014/0172351 A1* | 6/2014 | Barfield | .................... | G01C 5/06 702/138 |
| 2014/0323160 A1* | 10/2014 | Venkatraman | ........ | G01S 5/0236 455/456.6 |
| 2016/0109259 A1* | 4/2016 | Gunnarsson | ............. | G01C 5/06 73/1.59 |

* cited by examiner

*Primary Examiner* — Eman Alkafawi
(74) *Attorney, Agent, or Firm* — Lerner, David, Littenberg, Krumholz & Mentlik, LLP (57) ABSTRACT

Aspects of the present disclosure provide techniques for determining floors at a geographic location using barometric air pressure sensors in a mobile phone. An exemplary method includes identifying a first height associated with a location based on a client device. The first height indicates an entry level of the client device at the location. Using information regarding an amount of outside air pressure at the location, a pressure sensor in the client device is calibrated. A pressure offset for the location is calculated. The pressure offset identifies a difference between air pressure readings inside the location and the amount of outside air pressure at the location. Using the calibrated pressure sensor, a second height associated with the location is determined based on readings from the calibrated pressure sensor and the pressure offset. The second height indicates a different level at the location that the client device is currently on.

20 Claims, 7 Drawing Sheets

ENHANCING GEOLOCATION USING BAROMETRIC DATA TO DETERMINE FLOORS AT A LOCATION

BACKGROUND

Modern Smartphone devices are typically equipped with geolocation features, such as global positioning system (GPS) components. The GPS components may use signals from GPS satellites to identify a location of the devices in a three-dimensional space. However, using GPS to determine an altitude of the device may be only accurate to about 10 meters and usually requires that the device can receive information from at least four GPS satellites at the same time. Moreover, in locations where the GPS satellite signals are weak, for example, indoors, GPS may not function well or at all.

Some services are capable of providing an indoor location of the devices by using other information, such as from wireless access points or cell tower multilateration. Using this type of information, these services may be capable of determining a device's location in an area as small as 10 meters. However, in a building with multiple floors, 10 meters can be as far away as three floors of the building, leading to large inaccuracies.

BRIEF SUMMARY

Aspects of the disclosure may be advantageous in providing techniques for determining floors at a geographic location using barometric air pressure sensors in a client device, such as a mobile phone. One aspect of the present technology provides a method. The method includes identifying a first height associated with a location based on a client device. The first height indicates an entry level of the client device at the location. Using atmospheric information regarding an amount of outside air pressure at the location, a pressure sensor in the client device can be calibrated. A pressure offset for the location may be calculated. The pressure offset identifies a difference between air pressure readings inside the location and the amount of outside air pressure at the location. Using the calibrated pressure sensor, a second height associated with the location can be determined based on readings from the calibrated pressure sensor and the pressure offset. The second height indicates a different level at the location that the client device may be currently on.

In one example, calibrating the pressure sensor includes determining a differential amount of pressure between air pressure readings from the pressure sensor and the amount of outside air pressure at the location. The air pressure readings from the pressure sensor are adjusted based on the differential amount.

In one example, determining a first height associated with the location includes receiving positional information identifying a location of the client device. A ground level elevation of the client device at the positional information can be determined using a map. In this regard, a level at the location may be identified based on a difference between the ground level elevation at the client device and an elevation of the location.

In one example, calculating the pressure offset includes aggregating a number of air pressure readings recorded inside the location over a period of time. The aggregate air pressure readings may represent air pressure for one or more groups of levels at the location. In this example, the method may further include determining an air pressure offset for the one or more groups of levels. The air pressure offset includes a difference between the aggregate air pressure readings inside the location and the amount of outside air pressure at the location.

In one example, the method may further include transmitting the second height indicating a level at the location to a server. In response to the transmission, map information associated with the level is received from the server. The map information including information representing a location of the client device on that level is displayed.

Another aspect of the present technology provides a non-transitory computer readable medium including instructions that, when executed by a processor, cause the processor to perform a method. The method includes identifying a first height associated with a location based on a client device. The first height indicates an entry level of the client device at the location. Using atmospheric information regarding an amount of outside air pressure at the location, a pressure sensor in the client device can be calibrated. A pressure offset for the location may be calculated. The pressure offset identifies a difference between air pressure readings inside the location and the amount of outside air pressure at the location. Using the calibrated pressure sensor, a second height associated with the location can be determined based on readings from the calibrated pressure sensor and the pressure offset. The second height indicates a different level at the location that the client device may be currently on.

Yet another aspect of the present technology provides a system that includes a pressure sensor for reading air pressure, a memory for storing images and a processor coupled to the memory. The processor may be configured to identify a first height associated with a location based on a client device. The first height indicates an entry level of the client device at the location. Using atmospheric information regarding an amount of outside air pressure at the location, a pressure sensor in the client device can be calibrated. A pressure offset for the location may be calculated. The pressure offset identifies a difference between air pressure readings inside the location and the amount of outside air pressure at the location. Using the calibrated pressure sensor, a second height associated with the location can be determined based on readings from the calibrated pressure sensor and the pressure offset. The second height indicates a different level at the location that the client device may be currently on.

BRIEF DESCRIPTION

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The subject matter of the present disclosure relates generally to using barometric pressure sensors from user client devices, such as a mobile phone, to enhance information for indoor maps by determining levels at a geographic location (e.g., an indoor mall) with the devices. This may be useful in locating users within indoor locations that have multiple levels or floors. While aspects of the disclosure are discussed below in connection with certain types of locations, the techniques described herein can be used with other types of multilevel locations, such as hiking trails in rural area, where an accurate detection of a user's attitude can be beneficial.

By calibrating sensors in a number of client devices based on outside atmospheric air pressure at a known area, the calibrated client devices can be used to accurately determine levels inside a location associated with that area. The sensors may be calibrated against a standard, such as a broadcast of current outside atmospheric air pressure at the known area. In some aspects, a given client device can also be calibrated against other nearby calibrated user client devices that are within a certain range. Once calibrated, the sensors of a user's client device can determine small changes in air pressure and as a result they can sense a floor height change when the devices move to different levels (e.g., altitude) inside a location in the area.

A pressure offset may be calculated based on the calibrated client devices. The pressure offset includes a difference between air pressure in the location and an amount of outside atmospheric air pressure. Based on readings from the pressure sensor and the pressure offset, levels associated with the client device at the location may be determined. The levels may accurately indicate a current floor of the client device inside of the location.

For situations in which the subject matter described herein collects information about users, or may make use of user-related information, the users may be provided with an opportunity to control whether programs or features collect user information (e.g., information about a user's social network, social actions or activities, profession, preferences or a user's current location), or to control whether and/or how to receive content from a server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code or state level), so that a particular location of a user cannot be determined. Thus, the user may have control over how information is collected about the user and used by a server.

Figure 1:
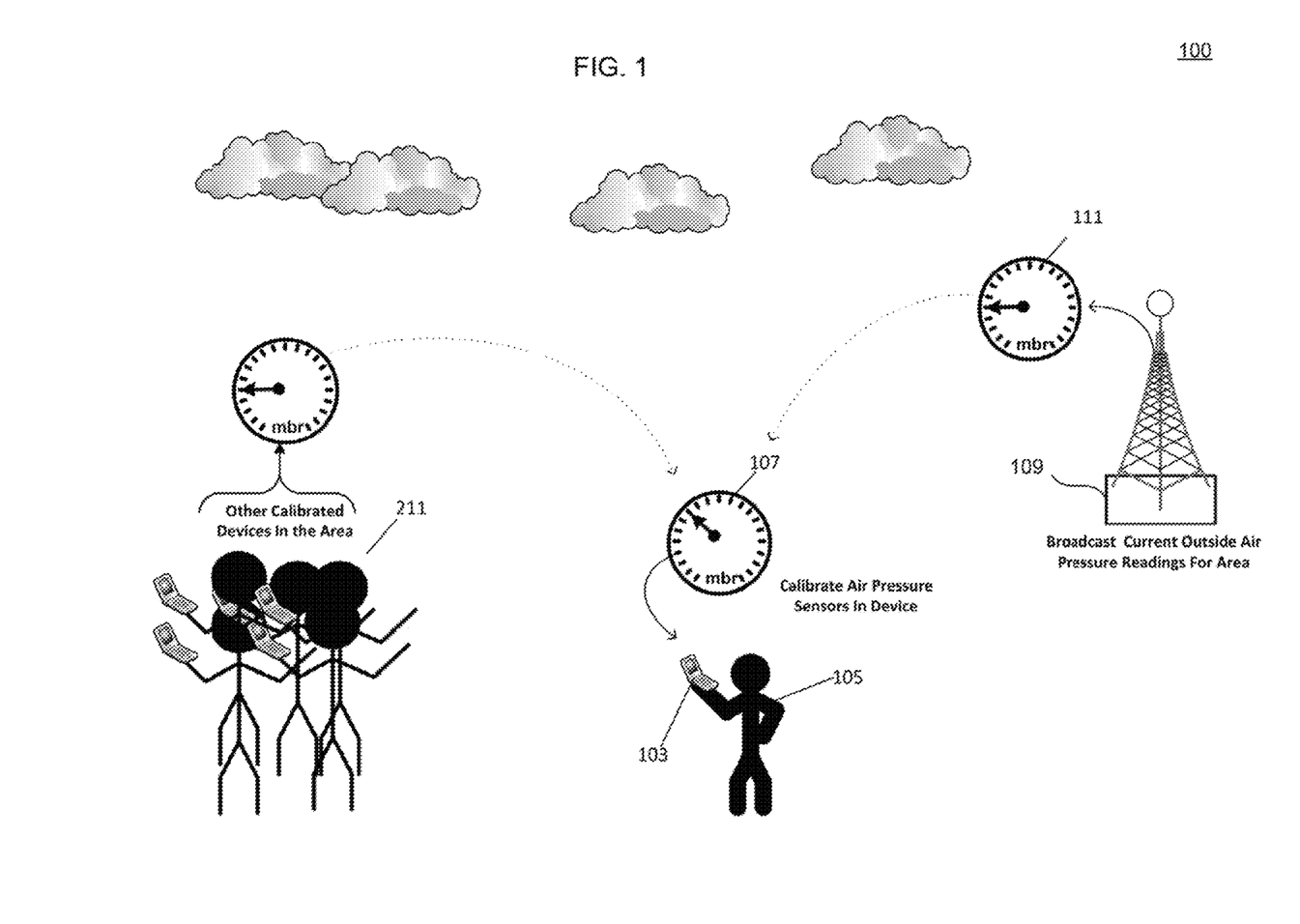
FIG. 1 is a diagram of an outside area including a user holding a client device in accordance with aspects of the disclosure.

FIG. 1 provides a diagram of an outside area 100, including a user 105 holding a client device 103. By using calibrated internal pressure sensors of the user's client device 103, an altitude of that device 103 inside of a location can be determined. The sensors are calibrated by determining an amount of air pressure that each sensor deviates from current outside atmospheric pressure. The amount of deviation may be used, for example, as a correction factor for the client device 103. In some aspects, calibration of the client device 103 may be repeated over a period of time (e.g., a few days) in order to ensure that the sensors are calibrated.

To calibrate the pressure sensors of client device 103, a geographic position of the device may be determined. For example, when geolocation features of the client device 103 are active, its current outside position may be determined. The geolocation features may cause the client device 103 to identify a position to use as a current geographic position of the device 103. For example, the geolocation features may retrieve positional information (e.g., longitude/latitude coordinates) for identifying a position of the client device 103. In one aspect, GPS satellites operable in an outside environment may be used to determine the current position of the client device 103. For example, the client device 103 may include a GPS receiver to determine the device's latitude/longitude positional coordinates. In other aspects, other types of positioning systems may be used to determine positional information associated with a location of the client device 103. For example, an inputted street address or other identifiers for known locations may be referenced against a database that includes latitude/longitude coordinates associated with theses known locations. For the locations that have a match in the database, the associated positional information may be returned.

Although the subject matter disclosed herein is not limited to a particular positional reference system, it may particularly advantageous to use latitude/longitude positions when referencing a point on the Earth. Accordingly, for ease of understanding and not by limitation, locations are expressed as latitude/longitude coordinates.

While in an outside area, an initial ground level elevation (e.g., altitude) of client device 103 can be determined based on its identified positional information. For example, latitude/longitude coordinates of client device 103 can be cross referenced against a type of topographic map to determine a current altitude of the client device 103. The topographic map may include contour lines that represent land contours, which connect contiguous coordinal points of the same altitude at a geographic location. Using this type of map, an altitude of the client device 103 can be interpolated based on a location of a nearest contour line to the device's identified coordinates.

Upon determining the ground level elevation of the client device 103, this measurement may be recorded. For example, the ground level elevation of the client device 103 may be stored in memory along with the identified position of the client device 103. In order to establish a benchmark reading for the area, the sensors of client device 103 may take one or more air pressure readings 107 of outside atmospheric air pressure. The sensors may measure and record outside air pressure outside in a unit of measurement used to represent air pressure readings, such as millibar (mbr). The air pressure readings 107 are also stored in memory along with the elevation of the client device 103 at the time the reading was made.

The air pressure readings 107 may be compared to a standard, such as atmospheric air pressure recently recorded in that area. As an example, a possible source of information regarding atmospheric air pressure for a geographic area may be a local weather station or national weather service, such as weather station 109 depicted in FIG. 1. For example, in response to receiving an identifier, such as the position information for client device 103, the weather station 107 may provide air pressure information about at that area. For example, the service may broadcast current atmospheric air pressure readings 111 in an area. The atmospheric air pressure readings 111 are based on current weather conditions and temperatures at the location. On some days, for example, when the weather conditions are fluctuating at certain extremes, such as during a storm or tornado, the client device 103 may be configured to ignore or otherwise not calibrate its internal sensors based on air pressure readings from that day.

A differential may be calculated between air pressure readings of the client device 103 and current air pressure readings 111 broadcast from the weather station 109. This differential may be stored in memory and applied to the air pressure readings 107 from client device 103 in order to compensate for possible measurement errors of the pressure sensors.

In some aspects, client device 103 can be calibrated against other client devices in the area 100. For example, calibration data of client device 103 may be calibrated against other nearby calibrated devices, such as the nearby calibrated devices 112 depicted in FIG. 1. These other nearby calibrated devices are typically at the same elevation as client device 103 and may be within a certain range (e.g., one kilometer). In this example, the calibration differential of client device 103 may be adjusted based on data from the other nearby calibrated devices 112.

If client device 103 is moving above a predetermined speed level, calibration of the device may not activate. For example, the device may be moving too fast to be properly calibrated. This can occur, for example, if the client device 103 is in a car, a plane (in cases where the users are traveling by plane these users are also not at ground level thereby making calibration of the sensors impractical) or some other type of vehicle that may be moving at a rate of speed where it can be difficult to obtain an accurate reading of air pressure. This speed level can be estimated, for example, based GPS signals received at the client device 103. For example, a time difference between received GPS signals for successive location points can be used to estimate the speed of the device between those points. In some aspects, calibration of the client device 103 may continue to activate when the device's movement falls below the predetermined speed level.

Activation of the calibration features of client device 103 can occur in various ways. For example, calibration of the device can be automatically activated upon certain conditions, or can be manually activated, such as when a user opts to use the calibration features of client device 103, or some combination thereof. As discussed above, users may be provided with an opportunity to control whether programs or features of the subject matter disclosed herein may collect user information or to control whether and/or how to receive information that may be of interest to the user. Certain data may also be treated in one or more ways before it is stored or used, so that no personally identifiable information can be determined for the user.

Figure 2:
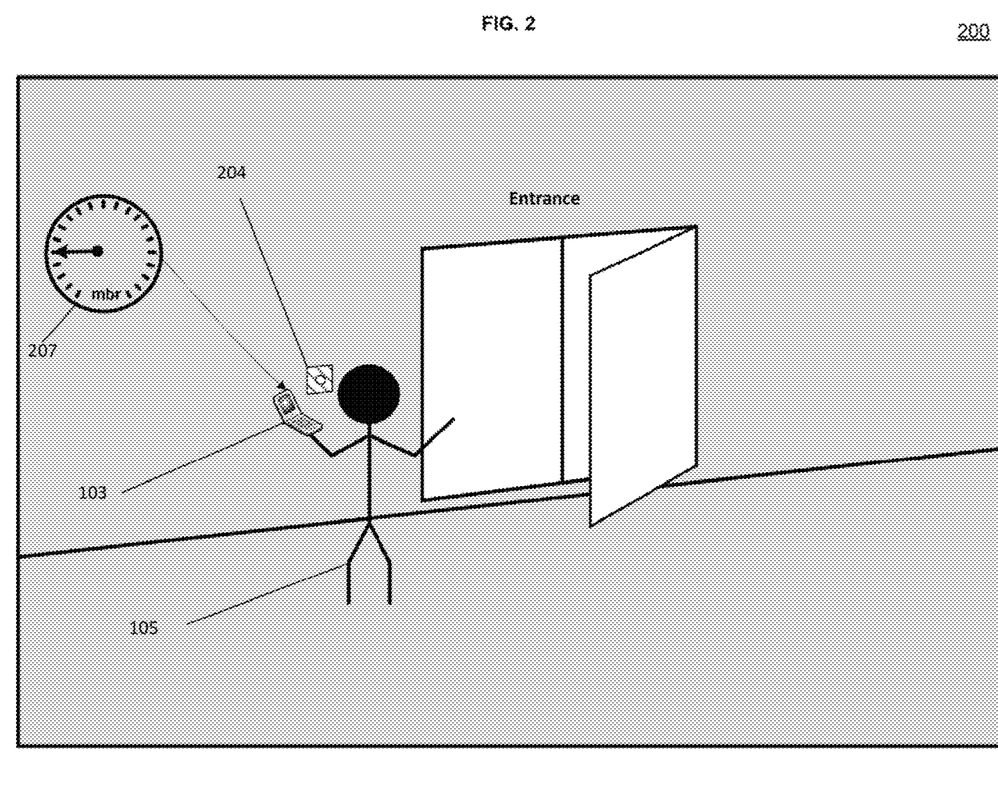
FIG. 2 is an illustrative diagram of a location entrance in accordance with aspects of the disclosure.

Automatic calibration of client device 103 can be configured to occur, for example, at reoccurring times every few days. In this manner, the calibration features may be operable in conjunction with other components of client device 103 used for automating certain features of the device 103, such as an internal clock or alarm. In other instances, automatic calibration of client device 103 may be activated upon the user 103 approaching a building or other types of locations, such as location 101. For example, as shown in FIG. 2, a location entrance 200 may include an activation panel 204 at the entrance. The activation panel 204 may detect when the client device 103 enters within a certain distance of the panel 204. The panel 204 thought a series of connections may cause the client device 103 to report its current status, which may include calibrating itself.

Once the pressure sensors are calibrated, the client device 103 may be used to determined floors inside of a multilevel location. For example, in FIG. 3, a diagram 300 of multiple levels (L1-L4) of a location 301 is shown. Once user 105 enters location 301, a pressure difference between inside air pressure readings 309 and outside atmospheric air pressure readings 307 may be sensed. There may be several reasons for the pressure change inside of location 301. For example, this may be due to a climate control system (e.g., a HVAC system) at the location or the location may be well sealed from outside conditions or etc.

Figure 3:
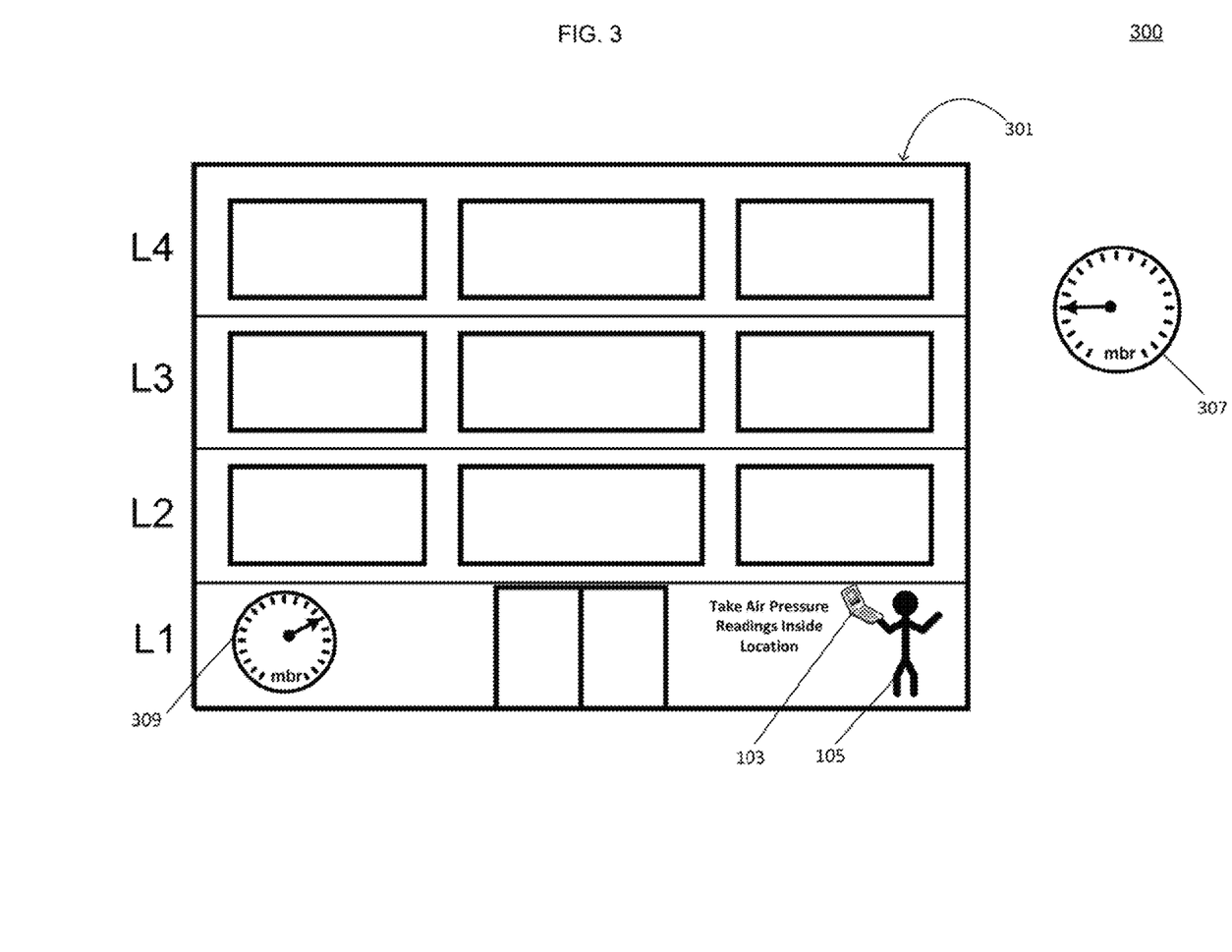
FIG. 3 is an illustrative diagram of multiple levels of a location in accordance with aspects of the disclosure.

The inside air pressure readings 309 at location 301 can be sensed by using the pressure sensors of client device 103. As discussed, the sensors may be calibrated based on the outside atmospheric air pressure readings 307 taken before entering location 301. The inside air pressure readings 309 may be reported by client device 103, for example, to a central server.

With a number of user client devices reporting (for example, over a period of time) inside air pressure readings for a location, an air pressure offset can be calculated for that location. This offset may be based on aggregate minimum and maximum air pressure readings taken at the location. For example, the minimum reading may be a smallest amount of air pressure sensed by a calibrated user device inside of the location. While the maximum readings may be a largest amount of air pressure sensed by a calibrated user device. In some instances, there can be multiple location air pressure offsets calculated for a given location. For example, a large location, such as a skyscraper, may have different air pressure offsets for different blocks of higher levels/floors.

It should be noted that depending on the size of a location, there can be multiple air pressure offsets calculated. For example, a rather large location, such as a skyscraper, may experience changes in air pressures for different blocks of floors or an upper level. In this example, a first block of floors at lower levels may be pressurized at one air pressure while block of floors at higher levels can be pressurized at different air pressures. In this instance, the air pressure offset may be calculated for a given block of floors based on aggregate minimum and maximum air pressure readings for those floors.

Referring to FIG. 3, it may be initially determined at which floor (typically ground level) user 103 entered location 301. The user's altitude before entering location 301 may be known based on the outside calibration of client device 103. In this aspect, an expected entry level for the user 103 at the location 301 can be determined based on this known altitude of client device 103 and an elevation of the location. It should be noted that in some cases the user may enter a location at a different level than ground level. For example, a user may climb exterior stairs of a building or an outside ramp that allows the user to enter a location at a level other than ground level. However, this change in the user's altitude before entering the location can be sensed based on their client device, which in turn can be used to determine the user's entry level at the location.

Upon determining that user 105 has entered location 301 at a certain level, a number of air pressure readings may be taken for a threshold period of time. This may be a period of time that the user may be expected to remain at the entry level before moving to a new level at the location. For example, this may be the time it takes for a user to enter an elevator after entering a building. The threshold time may be configurable based on user input or an analysis of various conditions (e.g., foot traffic at the location. During the threshold period of time, the client device 103 may take measurements of air pressure at the user's entry level until the pressure measurements stabilize.

Figure 4:
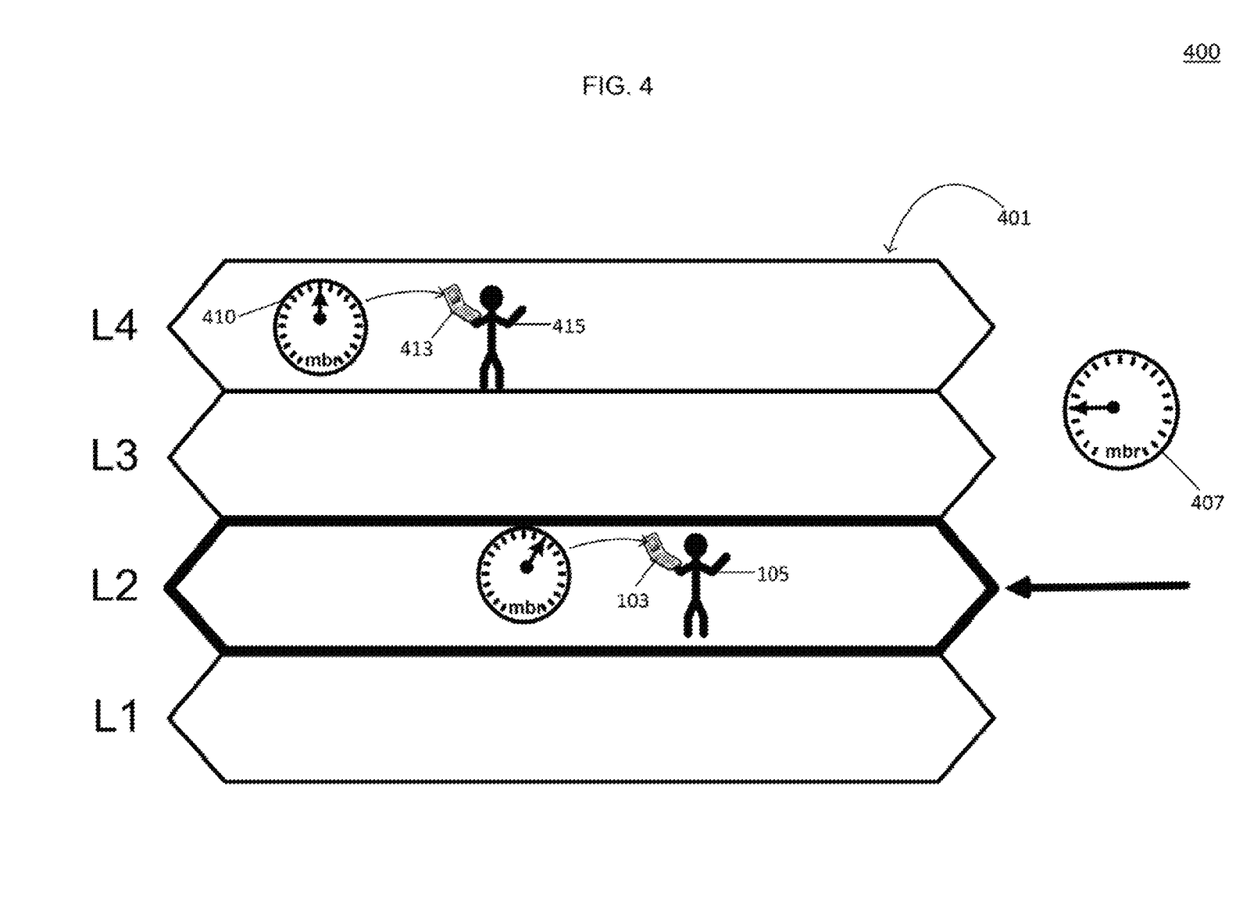
FIG. 4 is another illustrative diagram of multiple levels of a location in accordance with aspects of the disclosure.

FIG. 4 provides another illustrative diagram 400 of multiple levels (L1-L4) of a location 401. According to aspects, once an air pressure offset has been determined for location 401, a calibrated client device 103 may used to determine levels at that location 401. For example, as the user 105 moves to different levels within location 401, the air pressure readings will change at these different levels. For example, air pressure readings 410 at level L4 taken by another user 415 with their client device 413 will differ from air pressure readings taken by user 105 at level L2. The location offset may be applied to these readings to determine which level the client devices are on. Thus, in the example of FIG. 4, client device 103 may take air pressure readings and based on the air pressure offset for location 401 it may determine that the user 105 is located on level L2.

In some situations, outside ambient pressure can affect air pressure readings inside a location, such as location 401. For example, if a storm approaches location 401, measured air pressure for devices 103 and 413 inside the location may drop, even though the users 105 and 415 did not move to different levels. In such a case, if current outside ambient pressure readings also decrease as reported, for example, by a local weather station, then the combined relative changes can be used to determine that the drop in readings are not due to the users moving floors. Rather, the changes in that case are due to the storm.

Figure 5:
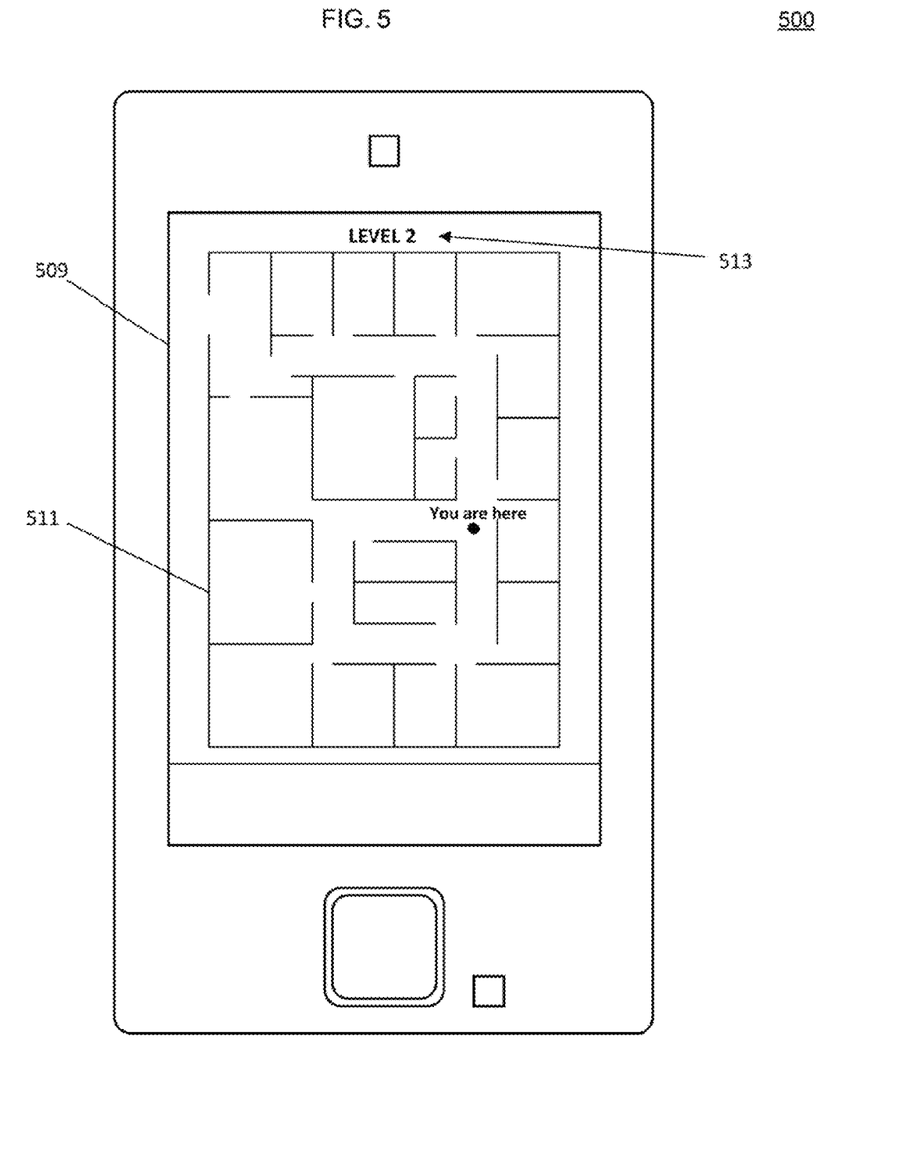
FIG. 5 is an illustrative example of a client device including a floor plan layout of a given level at a location in accordance with aspects of the disclosure.

FIG. 5 illustrates an example client device 500, such as the client device described with respect to FIGS. 1-4, including a floor map 511. In response to identifying a level associated with the client device 500 at a location using air pressure readings from the device (e.g., this may be a floor that the device is currently on), the floor map 511 of that level may be shown to a user on a display 509. For example, the client device 500 may include a display 509 for displaying information to the user. The floor map 511 may be transmitted by a connected server to the client device 500 based on the indicated level of that device. The floor map 511 may include information, such as an identifier 513 indicating the user's current floor, and other information representing locations on that floor. This floor map 511 may enable to user to identify various areas on the floor and the user's present location on that floor.

Figure 6:
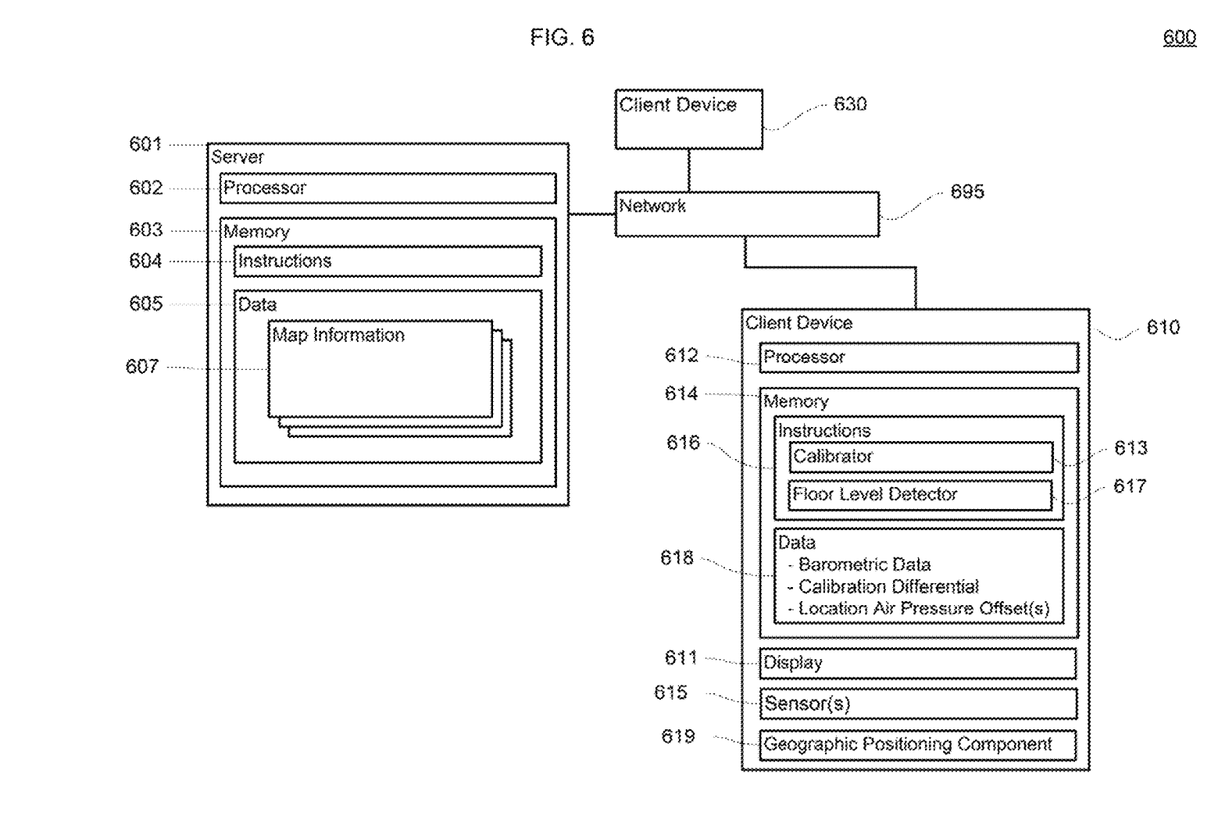
FIG. 6 is a block diagram of a system in accordance with aspects of the disclosure.

FIG. 6 provides a block diagram of a system 600, which may be used to detect levels inside a location. The system 600 includes a server 601 coupled to a network 695 and a number of client devices, such as client devices 610 and 630, capable of communicating with the server 601 over the network 695. The server 601 may include a processor 602, memory 603, and other components typically present in general purpose computers.

The memory 603 of server 601 may store information that is accessible by the processor 602, including instructions 604 that may be executed by the processor 602, and data 605. The memory 603 may be of a type of memory operative to store information accessible by the processor 602, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 604 and data 605 are stored on different types of media.

Although FIG. 6 functionally illustrates the processor 602 and memory 603 as being within the same block, the processor 602 and memory 603 may actually include multiple processors and memories that may or may not be stored within the same physical housing. For example, some of the instructions 604 and data 605 may be stored on removable CD-ROM and others within a read-only computer chip. Some or all of the instructions and data may be stored in a location physically remote from, yet still accessible by, the processor 602. Similarly, the processor 602 may actually comprise a collection of processors, which may or may not operate in parallel.

Data 605 may be retrieved, stored or modified by processor 602 in accordance with the instructions 604. For instance, although the present disclosure is not limited by a particular data structure, the data 605 may be stored in computer registers, in a relational database as a table having a plurality of different fields and records, XML documents, or flat files. The data 605 may also be formatted in a computer-readable format such as, but not limited to, binary values, ASCII or Unicode. By further way of example only, the data 605 may be stored as bitmaps comprised of pixels that are stored in compressed or uncompressed, or various image formats (e.g., JPEG), vector-based formats (e.g., SVG) or computer instructions for drawing graphics. Moreover, the data 605 may comprise information sufficient to identify the relevant information, such as numbers, descriptive text, proprietary codes, pointers, references to data stored in other memories (including other network locations) or information that is used by a function to calculate the relevant data.

The data 605 may include map information 607, which may include a series of floor plans representing an indoor space within a building. According to aspects, the map information 607 may be based upon a series of constraints (e.g., walls) representing locations where a user may not walk (or is not able to walk) within the building. These floor plan features may enable users to identify various areas of an indoor space. In some aspects, all or a portion of the map information 605 may be transmitted as needed to client devices 610 and 630 for storage there as well.

The server 601 may be at one node of network 695 and capable of directly and indirectly communicating with other nodes of the network 695. For example, the server 601 may include a web server that may be capable of communicating with client devices 610 and 630 via network 695 such that it uses the network 695 to transmit and display information to a user on a display of the client device 610. Server 601 may also include a plurality of computers, e.g., a load balanced server farm, that exchange information with different nodes of a network for the purpose of receiving, processing and transmitting data to client devices 610 and 630. In this instance, the client devices 610 and 630 will typically still be at different nodes of the network 695 than the computers comprising server 601.

The network 695, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client devices 610 and 630 over network 695.

Each client device 610 and 630 may be configured similarly to the server 601, with a processor 612, memory 614, instructions 616, and all of the internal components normally found in a personal computer. By way of example only, the client device 610 may include a central processing unit (CPU), display device 611 (for example, a monitor having a screen, a projector, a touch-screen, a small LCD screen, a television, or another device such as an electrical device that is operable to display information processed by the processor 612), CD-ROM, hard-drive, user input (not shown), such as a keyboard, mouse, touch-screen or microphone, speakers, modem and/or network interface device (telephone, cable or otherwise) and all of the components used for connecting these elements to one another.

The client device 610 may be a computing device. For example, client device 610 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 610, the client device 610 may be implemented as multiple devices with both portable and non-portable components (e.g., software executing on a rack-mounted server with an interface for gathering location information).

Although the client devices 610 may include a full-sized personal computer, the subject matter of the present disclosure may also be used in connection with mobile devices capable of wirelessly exchanging data. For example, client device 610 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers including general purpose computers, network computers lacking local storage capability, game consoles, and set-top boxes for televisions.

The client device 610 may include a geographic positioning component 619, such as circuits, to determine a geographic location of the device 610. For example, the client device 610 may include a GPS receiver to determine the device's latitude and longitude position. As the client device 610 changes location, for example by being physically moved, the GPS receiver may determine a new current location. By way of example only, the component 619 may include software for determining the position of the device based on other signals received at the client device 610, such as signals received at a cell phone's antenna from one or more cell phone towers if the mobile device is a cell phone. In that regard, the provision of location identification data may occur automatically based on information received from such a component.

The client device 610 may include one or more sensors 615 that include a pressure sensor for sensing air pressure at a location. For example, the pressure sensor may be configured to manually or automatically take barometric data readings of air pressure at a location. This barometric data may be stored in memory 614 as data 618 in unit of measurement used to represent air pressure, such as millibar (mbr), pounds per square inch (psi), Torr and other units of measurement.

The instructions 616 of the client device 610 may be a set of instructions to be executed directly (such as machine code) or indirectly (such as scripts) by the processor. In that regard, the terms "instructions," "steps" and "programs" may be used interchangeably herein. The instructions 616 may be stored in object code format for direct processing by the processor, or in another computer language including scripts or collections of independent source code modules that are interpreted on demand or compiled in advance. Functions, methods and routines of the instructions are explained in more detail below.

The instructions 616 may include a calibrator 613 for calibrating the pressure sensors of client device 610. For example, the sensors may be calibrated against a broadcast of current atmospheric air pressure at a known location. System 600 may further include a source that provides information about current atmospheric air pressure at the known location. The source may be stored at server 601 or may include external sources such as websites. As noted above, one possible external source of information is weather service. For example, in response to receiving a location identifier over network 695, the weather service may provide information about current atmospheric air pressure at that location.

Air pressure readings from the pressure sensors may be compared to the atmospheric air pressure broadcast. Based on the comparison, a calibration differential may be calculated between air pressure readings of the client device 610 and the atmospheric air pressure broadcast. This calibration differential may be applied to the barometric readings of client device 610 as a correction factor for the pressure sensors. In one aspect, the system 600 may store and retrieve the calibration differential from memory 614.

In order to facilitate the level detection operations of system 600, the client device 610 may further include a level detector module 617. The functionally of this module can exist in a fewer or greater number of modules than what is shown, with such modules residing at one or more computing devices, which may be geographically dispersed. The level detector module 617 may be operable in conjunction with the client device 610 from which it may receive information regarding various air pressures in and around a specific location. In turn, this information may be used by the level detector module 617 to determine what level a user may be on as the user moves to different levels within the location.

Techniques for determining a user's level at a location, for example using the system 600 discussed above, will now be described. It should be understood that the following operations do not have to be performed in the precise order described below. Rather, as mentioned above, various operations can be handled in a different order or simultaneously, and operations may be added or omitted.

Figure 7:
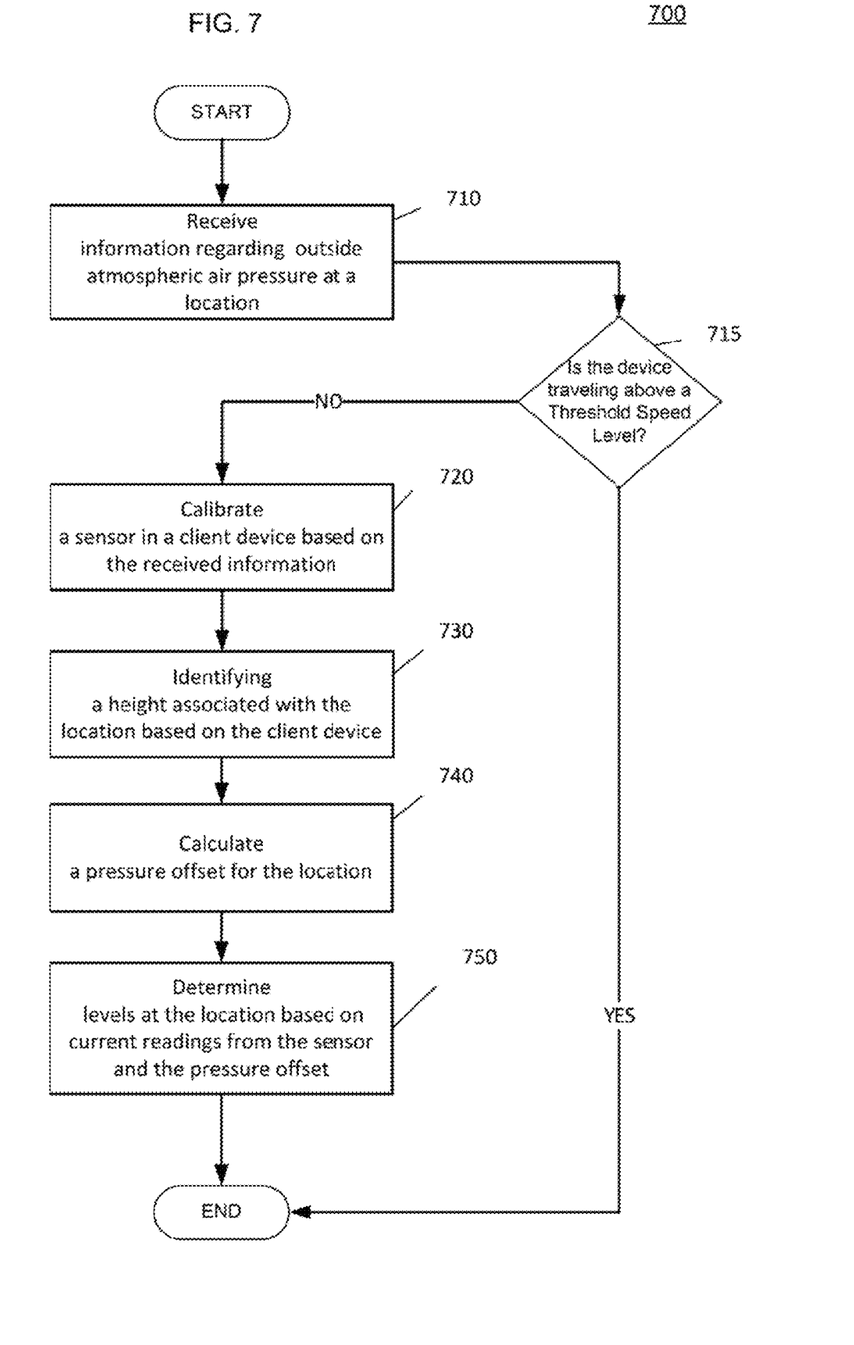
FIG. 7 is a flow diagram of a method in accordance with aspects of the disclosure.

FIG. 7 provides a flow diagram of a method 700 according to some of the aspects described above. At stage 710, information may be received regarding outside atmospheric air pressure at a location. For example, this atmospheric information may be received from a source, such as the national weather service. The source may provide information regarding outside atmospheric air pressure at the location. For example, in response to receiving a location identifier for the location from a client device, the service may provide a current atmospheric air pressure broadcast for a geographic area associated with the identified location. In this regard, geolocation features of the client device (e.g., a GPS receiver) may be used to identify the location. For example, this may be a current longitude/latitude coordinate for the device. In some instances, a user may identify a location of the client device by inputting location information, such as an address or other identifying information for a location.

At stage 715, it is determined whether the client device is traveling at or above a threshold speed level. For example, the threshold speed level may indicate an empirically determined rate of travel where it may difficult to obtain accurate air pressure readings. The traveling speed of the client device can be estimated, for example, based on wireless signals (e.g., GPS, WiFI, etc.) received at the client device. Base on the device's movement, its traveling speed can be estimated. This threshold level may be stored and updated as necessary, for example, depending on the type of air pressure sensor used for taking readings.

If the traveling speed of the device meets or exceeds the threshold speed level, the method 700 may automatically stop. Otherwise, method 700 may continue onto stage 720. In some instances, if the traveling speed of the device meets the threshold speed level, method 700 may wait for a period of time until the traveling speed falls below the threshold speed level, then method 700 may proceed to stage 720.

At stage 720, a sensor in a client device may be calibrated based on the received information. For example, the sensor may be calibrated by determining an amount that the pressure sensor deviates from the atmospheric air pressure information received at stage 710. To calibrate the sensor, it may take one or more barometric readings of atmospheric air at its current location. In some instances, this may occur over a period of time. The barometric readings may be compared to the atmospheric information received at stage 710. Based on the comparison, a differential may be calculated between air pressure readings from the pressure sensor and the atmospheric information received at stage 710. This differential may be stored in memory and applied to future barometric readings of the pressure sensor, for example, as a correction factor.

At 730, a height associated with the location may be identified based on the client device. For example, the height may indicate a floor in which the client device entered the location. For example, the device's altitude (e.g., ground level elevation) before entering the location may be determined during the calibration techniques employed at stage 720. An expected entry level for the device can then be determined based on the device's known altitude and a ground height of a location.

As discussed in regards to stage 720, geolocation features of the client device or a user may identify positional information associated the client device's location. Based on this positional information, the client device's initial altitude can be determined using a map (e.g., a type of topographic map) that includes contour lines of elevation. For example, the positional information (e.g., latitude/longitude coordinates) for the client device can be cross referenced against the map to determine a current altitude of the device at those specific coordinates.

At stage 740, a pressure offset for the location may be calculated. This pressure offset may represent a difference between air pressure in the location and the amount of outside atmospheric air pressure at the location. The air pressure offset may be based on, for example, an aggregate of barometric readings taken at location by a number of calibrated client devices. In some instances, depending on the size of a location, there can be multiple air pressure offsets. For example, for a rather large location, such as a skyscraper, there may be changes in air pressures for different blocks for higher upper levels.

At stage 750, levels at the location may be determined based on current readings from the sensor and the pressure offset. According to aspects, the sensor calibrated at stage 730 may be used to determine levels within the location. For example, as the device moves to different levels within the location, the air pressure may change. The client device may take air pressure readings with the sensor at these different levels. The location offset may be applied to these readings to determine which level the client device may be currently on. In some instances, a map of that specific level of the location may be shown to a user on a display of the user's client device. The map may indicate the user's current location on that specific level.

The above-described aspects of the present disclosure may be advantageous for enhancing geolocation services in locating users within a multilevel location. For example, this may be usefully for routing information: such as (1) for mapping indoor spaces and pathways in a multilevel location, (2) for managing foot traffic at different levels in a location by determining users vertical locations, (3) for accurately directing emergency services to a user in a multilevel location, for example, by providing a user's altitude information in a 911 call, (4) for verifying locations of hiking trails in rural areas based on altitude confirmation, (5) for blurring a user's home or work location by identifying, for example, the user's present location as being at business on a different level of the user's home address like a basement grocery store at the user's home, and (6) for getting around a location, such a mall or building, by providing a correct floor map for a user's given altitude in the location.

Other useful advantages may include enhancing (a) proximity alerts: by more accurately informing users about when they are near someone or something that is not only at their location but also on their floor, (b) billing for advertisements: by determining that a user went near a store in a multilevel location, such as a mall, after receiving advertisements about that store, (c) social media: by accurately determining a user's location which can be used, for example, for soliciting information and reviews about a place the user may have visited in a multilevel location like an upper floor restaurant and (d) data models of a location: by refining maps of that location based on user collected sensor data, for example, to account for interior stairwells and elevators traversed by a user.

Still further, the subject matter disclosed herein may be advantageous for adjusting features of a user's client device (e.g., volume controls of a mobile phone) based upon what level the user may be currently on at a location. For example, the cafeteria at a location may be on a certain floor and when it is determined that a user is on that floor, the ring tones on the user's mobile phone may be automatically adjusted higher to compensate for potential cafeteria noise.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method, comprising:
   identifying a first height associated with an indoor location based on a client device, the first height indicating an entry level of the client device at the indoor location, wherein a pressure sensor in the client device is calibrated using atmospheric information regarding an amount of outside air pressure at the location at the first height;
   receiving a number of indoor air pressure readings at the client device over a threshold period of time, the threshold period of time corresponding to an amount of time the client device is expected to remain at the first height before moving to a second height, the threshold period of time based on a location of entry into the indoor location in relation to a location of access to the second height;
   calculating, using a processor, at least one pressure offset for the indoor location based on the received indoor air pressure readings from the client device over the threshold period of time and aggregate stabilized minimum and maximum readings from a plurality of devices at the location, the at least one pressure offset including a difference between air pressure readings inside the indoor location and the amount of outside air pressure outside the location;
   receiving second indoor air pressure readings from the calibrated pressure sensor in the client device after the client device has moved to the second height;
   determining, using the processor, the second height associated with the indoor location based on the second received indoor air pressure readings from the calibrated pressure sensor and the pressure offset, the second height indicating a second level different from the entry level at the indoor location; and
   updating a display of the client device based on the different level at the location.

2. The method of claim 1, wherein calibrating the pressure sensor comprises determining a differential amount of pressure between air pressure readings from the pressure sensor and the amount of outside air pressure at the location, the air pressure readings from the pressure sensor being adjusted based on the differential amount.

3. The method of claim 1, wherein identifying a first height associated with the location comprises:
   receiving positional information identifying a location of the client device;
   determining, using a topographic map, a ground level elevation of the client device at the positional information; and
   identifying a level at the location based on a difference between the ground level elevation at the client device and an elevation of the location.

4. The method of claim 1, wherein calculating the pressure offset comprises aggregating a number of air pressure readings recorded inside the location over a period of time, wherein the aggregate air pressure readings represent air pressure for one or more groups of levels at the location.

5. The method of claim 4, further comprising determining an air pressure offset for the one or more groups of levels, wherein the air pressure offset comprises a difference between the aggregate air pressure readings inside the location and the amount of outside air pressure at the location.

6. The method of claim 1, further comprising:
   transmitting the second height indicating a level at the location to a server;
   in response to the transmission, receiving map information associated with the level from the server; and
   displaying the map information including information representing a location of the client device on that level.

7. The method of claim 1, wherein the threshold period of time is configurable.

8. The method of claim 7, wherein the threshold period of time is configurable based on user input.

9. The method of claim 7, wherein the threshold period of time is configurable based on conditions at the entry level of the indoor location.

10. A non-transitory computer readable medium comprising instructions that, when executed by a processor, cause the processor to perform a method, the method comprising:
    identifying a first height associated with an indoor location based on a client device, the first height indicating an entry level of the client device at the indoor location, wherein a pressure sensor in the client device is calibrated using atmospheric information regarding an amount of outside air pressure at the location at the first height;
    receive a number of indoor air pressure readings over a threshold period of time, the threshold period of time corresponding to an amount of time the client device is expected to remain at the first height before moving to a second height, the threshold period of time based on a location of entry to the indoor location in relation to a location of access to the second height;
    calculating, using the processor, at least one pressure offset for the indoor location based on the received indoor air pressure readings from the client device over the threshold period of time and aggregate stabilized minimum and maximum readings from a plurality of devices at the location, the at least one pressure offset including a difference between air pressure readings inside the indoor location and the amount of outside air pressure outside the location;
    receiving second indoor air pressure readings from the calibrated pressure sensor in the client device after the client device has moved to the second height;
    determining the second height associated with the indoor location based on the second received indoor air pressure readings from the calibrated pressure sensor and the pressure offset, the second height indicating a second level different from the entry level at the indoor location; and
    updating a display of the client device based on the different level at the location.

11. The non-transitory computer readable medium of claim 10, wherein calibrating the pressure sensor comprises determining a differential amount of pressure between air pressure readings from the pressure sensor and the amount of outside air pressure at the location, the air pressure readings from the pressure sensor being adjusted based on the differential amount.

12. The non-transitory computer readable medium of claim 10, wherein identifying the first height associated with the location comprises:
receiving positional information identifying a coordinal location of the client device;
determining, using a topographic map, a ground level elevation of the client device at the positional information; and
identifying a level at the location based on a difference between the ground level elevation at the client device and an elevation of the location.

13. The non-transitory computer readable medium of claim 10, wherein calculating the pressure offset comprises aggregating a number of air pressure readings recorded inside the location over a period of time, wherein the aggregate air pressure readings represent air pressure for one or more groups of levels at the location.

14. The non-transitory computer readable medium of claim 13,
further comprising determining an air pressure offset for the one or more groups of levels, wherein the air pressure offset comprises a difference between the aggregate air pressure readings inside the location and the amount of outside air pressure at the location.

15. A system, comprising:
a pressure sensor for reading air pressure;
a memory; and
a processor coupled to the memory, the processor being configured to:
identify a first height associated with an indoor location based on a client device, the first height indicating an entry level of the client device at the indoor location, wherein a pressure sensor in the client device is calibrated using atmospheric information regarding an amount of outside air pressure at the location at the first height;
receive a number of indoor air pressure readings over a threshold period of time, the threshold period of time corresponding to an amount of time the client device is expected to remain at the first height before moving to a second height, the threshold period of time based on a location of entry into the indoor location in relation to a location of access to the second height;
calculate at least one pressure offset for the indoor location based on the received indoor air pressure readings from the client device over the threshold period of time and aggregate stabilized minimum and maximum readings from a plurality of devices at the location, the at least one pressure offset including a difference between air pressure readings inside the indoor location and the amount of outside air pressure outside the location;
receive second indoor air pressure readings from the calibrated pressure sensor in the client device after the client device has moved to the second height; and
determine, using the calibrated pressure sensor, the second height associated with the indoor location based on the second received indoor air pressure readings from the calibrated pressure sensor and the pressure offset, the second height indicating a second level different from the entry level at the indoor location; and
update a display of the client device based on the different level at the location.

16. The system of claim 15, wherein to calibrate the pressure sensor the processor is further configured to determine a differential amount of pressure between air pressure readings from the pressure sensor and the amount of outside air pressure at the location, the air pressure readings from the pressure sensor being adjusted based on the differential amount.

17. The system of claim 15, wherein to identify the first height associated with the location the processor is further configured to:
receive positional information identifying a location of the client device;
determine, using a topographic map, a ground level elevation of the client device at the positional information; and
identify a level at the location based on a difference between the ground level elevation at the client device and an elevation of the location.

18. The system of claim 15, wherein to calculate the pressure offset the processor is further configured to aggregate a number of air pressure readings recorded inside the location over a period of time, wherein the aggregate air pressure readings represent air pressure for one or more groups of levels at the location.

19. The system of claim 18, wherein the processor is further configured to determine an air pressure offset for the one or more groups of levels, wherein the air pressure offset comprises a difference between the aggregate air pressure readings inside the location and the amount of outside air pressure at the location.

20. The system of claim 15, the processor is further configured to:
transmit the second height indicating a level at the location to a server;
in response to the transmission, receive map information associated with the level from the server; and
display the map information including information representing a location of the client device on that level.

* * * * *